United States Patent [19]

Myllymäki

[11] Patent Number: 5,278,888
[45] Date of Patent: Jan. 11, 1994

[54] INTELLIGENT ALARM APPARATUS WITH INTERFACING TO A TELEPHONE NETWORK

[75] Inventor: Matti Myllymäki, Espoo, Finland

[73] Assignee: Sostel Oy, Espoo, Finland

[21] Appl. No.: 868,477

[22] Filed: Apr. 14, 1992

Related U.S. Application Data

[63] Continuation-in-part of Ser. No. 508,091, Apr. 11, 1990, abandoned.

[51] Int. Cl.$^5$ .................................... H04M 11/04
[52] U.S. Cl. ................................................ 379/39
[58] Field of Search ............ 379/413, 39, 40, 42–45; 379/49; 379/50; 379/106

[56] References Cited

U.S. PATENT DOCUMENTS 4,390,750  6/1983  Bartelink .......................... 379/40
4,691,344  9/1987  Brown et al. ..................... 379/106

FOREIGN PATENT DOCUMENTS 8904574  5/1989  World Int. Prop. O. ............ 379/40

Primary Examiner—Wing F. Chan
Attorney, Agent, or Firm—Marshall & Melhorn

[57] ABSTRACT

An intelligent alarm apparatus with a telephone network interface. The alarm apparatus includes an alarm sensor, which is directly connected at a high impedance level through an integrator and a detector to the alarm signal input of a programmable processor. The processor is in a power-saving standby mode until an alarm signal is received. Once an alarm signal is received at the processor, an output signal is transmitted to the designation programmed in the processor. A power supply section of the alarm apparatus is connected to a telephone line from which the alarm apparatus obtains its power feed.

16 Claims, 2 Drawing Sheets

INTELLIGENT ALARM APPARATUS WITH INTERFACING TO A TELEPHONE NETWORK

This application Ser. No. 07/868,477 is a continuation-in-part of application Ser. No. 07/508,091 filed on Apr. 11, 1990.

BACKGROUND OF THE INVENTION

1. Field of the Invention

The present invention relates generally to an intelligent alarm apparatus with a telephone interface, and more particularly to an alarm apparatus connected to a standard telephone network with operating power furnished by the telephone network, and including a programmable processor for analyzing input from alarm sensors and directing an alarm signal to a remote location programmed in the processor.

2. Description of Related Art

A number of alarm systems are currently in use in which an alarm sensor transmits a signal through the telephone network by means of an automatic calling unit to a remote location.

Prior art sensors require interfacing at a low impedance level. The alarm message from a sensor is routed in the form of a current signal to an alarm system control unit. Several sensors may be attached to the control unit, each at a separate input. Further, the supply voltage to the sensors is provided by the alarm system power supply. The control unit of the alarm system transfers a signal from an alarm sensor to an automatic calling unit, which subsequently transmits the alarm signal to an alarm control point.

In a conventional system, the alarm control unit requires a power supply and backup battery. In addition, the automatic calling unit requires a separate power supply with a backup battery. The batteries must be dimensioned so as to have a sufficient capacity, even when the current loads of the sensor loops are included. For minimized disturbance, the loop current levels are typically in the order of 5 to 10 mA. Consequently, small systems requiring only one or two sensors would be excessively complicated and costly to build.

Furthermore, the battery life is limited and a battery malfunction causes the majority of faults in an alarm system.

SUMMARY OF THE INVENTION

The object of the invention is to achieve an alarm apparatus which replaces an alarm control unit and an automatic calling unit, yet still provides equivalent functions. The particular object of the invention is to achieve an alarm sensor which is directly interfaceable to the telephone network without the need for a local power supply and backup battery.

In accordance with the present invention, a single alarm sensor of low current consumption is used. The alarm sensor is mounted in the same encapsulation with a processor and is attached directly, without the use of an alarm control unit, to the alarm signal interrupt input of the processor. In its standby state, the processor is set to a power-saving state called the "wait" mode. It is not until an alarm signal is generated by the alarm sensor that the wait mode is interrupted and the procedure for alarm transmission (equally as with an automatic calling unit) to the alarm control point is initiated. The processor analyzes the signal from the alarm sensor to ensure that an alarm condition has occurred before initiating the alarm transmission. Additional local and remote sensors may be added to the system to provide more comprehensive protection.

The supply voltage is provided from the telephone network, which may be loaded up to 1 mA maximum according to regulations concerning the construction of telephone networks. This low level of consumption is obtained by a high impedance sensor circuit and by holding the processor in the standby or wait mode.

Moreover, programmed data is stored in an EPROM type memory of the processor, whose supply voltages are switched on only for a read or write operation. The entire circuit configuration is designed using low-power components of conventional technology.

The standby condition time is additionally utilized for charging the "storage" capacitor of the alarm apparatus, which supplies energy during an alarm condition of the alarm apparatus.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
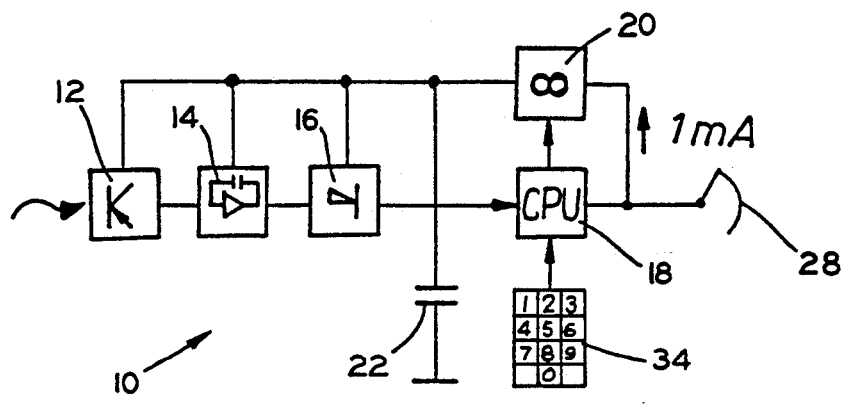
FIG. 1 shows the block diagram of the intelligent alarm apparatus according to the present invention.
Figure 2:
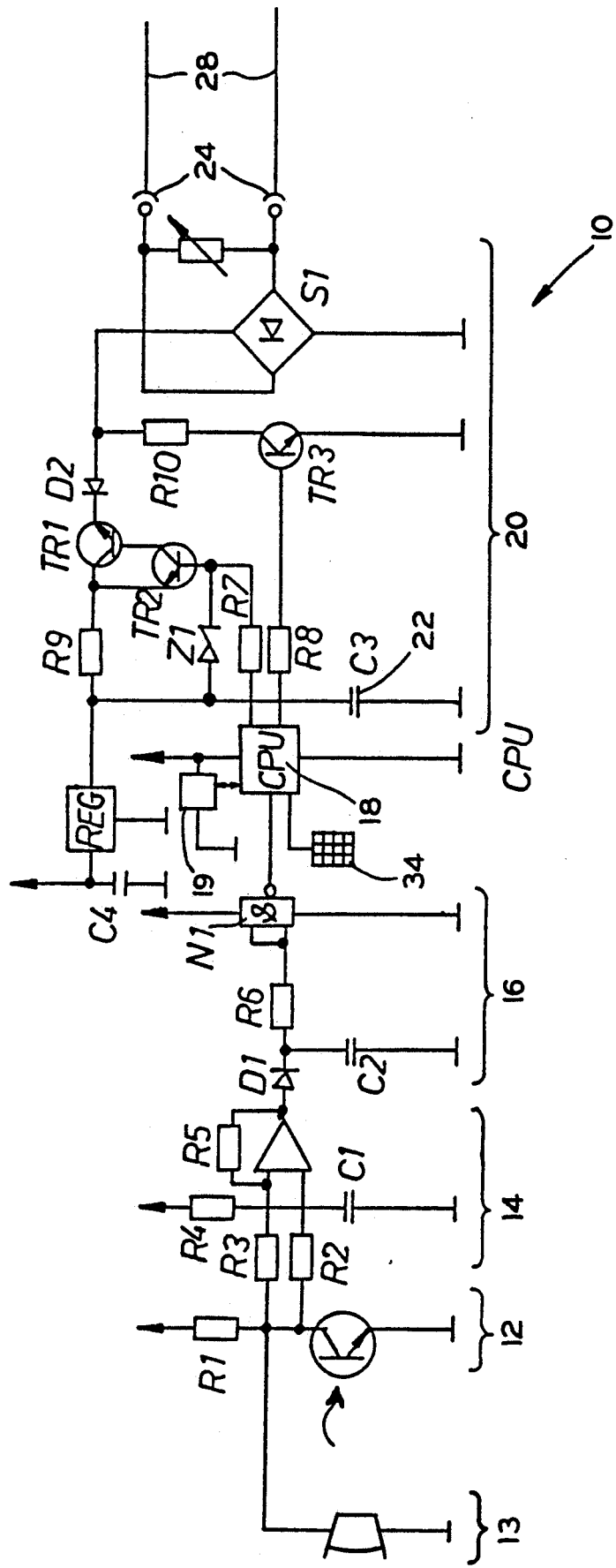
FIG. 2 shows the circuit diagram of the alarm apparatus shown in FIG. 1 with the processor being shown in a simplified form.

Referring now to the drawings, there is illustrated in FIGS. 1 and 2 the alarm apparatus 10 of the present invention, including a sensor 12, an integrator 14, a detector 16, a processor 18, a power supply section 20 with storage capacitors 22, and a telephone connector 24.

Figure 3:
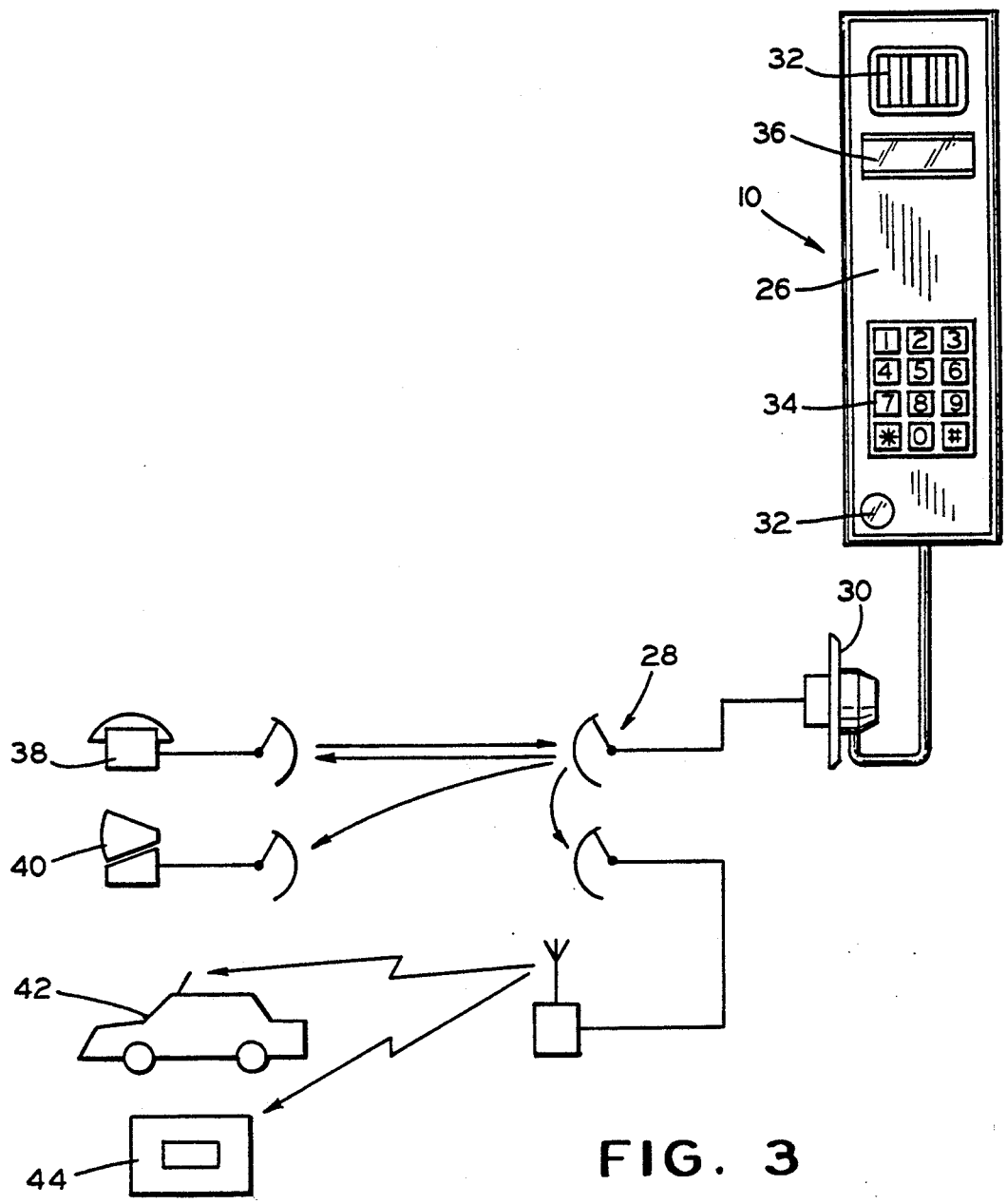
FIG. 3 shows the alarm apparatus in a wall mount enclosure connected to a wall outlet of a telephone network for communication with remote locations.

The alarm apparatus 10 of the present invention, as shown in FIG. 3, is encased in a wall-mounted enclosure 26 and connected to a telephone network 28 at wall receptacle 30. The enclosure 26 includes one or more apertures 32 to facilitate operation of the sensor 12, which is mounted in the enclosure 26. A telephone-style keyboard 34 is located on the surface of the enclosure 26 and is connected to the processor 18. The processor 18 may include a digital readout 36 to assist in programming the processor 18 and to provide means for obtaining information at the location of the processor 18. The telephone network 28 provides power to the power supply section 20 and is used to transmit signals between the alarm apparatus 10 and various remote locations, including telephones 38, work stations 40, mobile telephones 42, and pager systems 44.

In the alarm system 10, an infra-red sensor 12 is attached to an operational amplifier configured as a integrator 14 in order to make the circuit tolerant to slow changes in the sensed environment. The time constant related to the rate-of-change is determined by elements C1 and R2 as shown in FIG. 2. When the variations in the sensed environment have a low rate-of-change, such as that of the room temperature, C1 is being charged making an equal voltage to be applied to the inverting and noninverting inputs of the operational amplifier so that the operational amplifier output is held to a "zero" level.

During quick variations in the sensed environment that exceed the time constant formed by C1 and R2, the operational amplifier output produces a fast pulse, which charges C2. The circuit configuration of C2, R6, and N1 forms a detector 16, which extends the detected pulse and generates an interrupt signal for the processor 18.

In the standby mode, the processor 18 is held in the low-power "wait" state. Upon receipt of an interrupt signal from the detector 16, the processor 18 analyzes the signal to determine if an alarm condition has occurred, and upon receipt of an appropriate alarm signal, initiates the call procedure for transmitting information to a remote location 38.

The telephone network 28 supplies power to the alarm apparatus 10 and is used for transmitting control signals from remote locations to the processor 18 and for transmitting alarm signals from the processor 18 to telephone numbers programmed in the processor 18. The supply voltage of the circuitry is delivered by a feed bridge S1 and constant current generators TR1 and TR2, together with storage capacitors C3 and C4. The storage capacitors C3 and C4 are high-capacitance capacitors and are selected for their energy storage capabilities. The storage Capacitors C3 and C4 are charged at a constant current of approximately 1 mA by the constant current generators TR1 and TR2 connected to telephone line 6. The storage capacitors C3 and C4 operate as backup power sources during number dialing or short-term breaks of telephone network 28 connections.

The processor 18 is located in proximity to the sensor 12 and operates from power supplied by the telephone network 28. The processor 18 is not at a separate location and does not require a separate power supply.

When the processor 18 receives an interrupt signal from a sensor 12 or receives an incoming signal from a remote telephone 38 with the proper access code, the power supply section 20 with storage capacitors 22 energizes the processor 18 for receiving and transmitting information through the telephone network 28. Power is supplied to the processor 18 only during such "read or write" operations, after which the processor 18 returns to the "wait" mode.

The processor 18 has certain operational and diagnostic capabilities which may be accessed by the user upon entering the proper user or programmer access codes for the processor 18. Telephone numbers, sensor settings, and other programmable variables are entered into the memory 19 of the processor 18 by use of the keyboard 34 or through the use of a digital telephone at a remote location 38. The processor 18 may include such features as a programmable timer to determine the days and hours during which the alarm apparatus 10 is operational. The diagnostic capabilities of the processor 18 permit the remote user to determine the cause of an alarm signal, such as temperature increase or motion in the premises.

The processor 18 also analyzes the interrupt signals from the detector 16 before generating an alarm output signal, which significantly reduces false alarms. The processor 18 does not respond unless the interrupt signal matches the predefined signal characteristics for the sensor 12 used in the alarm apparatus 10. The processor 18 may also be programmed to be more or less sensitive to the interrupt signals from the sensor 12 through the integrator 14 and the detector 16. This variable sensitivity also helps to minimize false alarm signals from the alarm apparatus 10 without compromising the effectiveness of the alarm system protection.

As noted above, the processor 18 may be programmed in connection with the analysis of the alarm interrupt signal transmitted to the processor 18. The processor is also programmed for transmission of an alarm signal from the processor 18 to one or more remote locations 38, 40, 42, and 44 having the appropriate telephone numbers programmed in the processor 18. The telephone number for receipt of alarm signal can be changed by using the local keyboard 34 or by using a digital telephone at a remote location 38 delete old telephone number and enter new telephone numbers into the processor 18.

In the present invention, a single infra-red sensor 12 is encapsulated with the processor 18 to achieve a low cost and convenient alarm system. The infra-red sensor 12 reacts to heat radiation and detects human and animal intruders by body heat radiation. The alarm apparatus 10 could also include an sound-activated sensor 13 in place of the infra-red sensor 12, or the two sensors could be mounted in parallel in the same alarm apparatus 10. The sound-activated sensor 13 reacts to low level sounds and pressure changes and allows direct sound monitoring of the area surrounding the alarm apparatus 10 from a remote location 38.

Since the alarm apparatus 10 has an internally mounted sensor 12 and can be operated by plugging the apparatus into a telephone network 28, a portable enclosure (not shown) could be used to enclose the alarm apparatus 10. The processor 18 is mounted in proximity to the sensor 12 and both the processor and the sensor operate with power supplied by the telephone network 28.

In addition to the two internal sensors, the alarm apparatus may also include terminals (not shown) for receiving signals from a plurality of external sensors, such as smoke detectors and water leak detectors.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An alarm apparatus for monitoring the condition of a premises, comprising:
   a telephone circuit connected to the premises;
   means connected to said telephone circuit for obtaining power from said telephone circuit;
   sensing means, connected to said means for obtaining power, for detecting a predetermined condition at the premises and generating a sensor signal;
   detector means, connected to said sensing means, for receiving and integrating the sensor signal and generating an interrupt signal;
   programmable processing means for receiving and analyzing the interrupt signal, and for transmitting and receiving information signal to and from a selected receiver in communication with said telephone circuit, said processing means being connected to said means for obtaining power, said detector means and said telephone circuit, and being maintained in a stand-by mode until said processing means receives an information signal or an interrupt signal for starting an operational mode; and charging circuit means for supplying back-up power to said sensing means, said detector means, and said processing means, said charging circuit means being connected to said means for obtaining power whereby said means for obtaining power charges said charging circuit means during the stand-by mode, and said charging circuit means provides power during the stand-by mode when said telephone circuit is disconnected from said means for obtaining power and during the operational mode.

2. The alarm apparatus defined in claim 1 wherein said means for obtaining power includes a bridge, a constant current generator, and an energy storing capacitor whereby said means for obtaining power supplies operational power to both said sensing means and said processing means.

3. The alarm apparatus defined in claim 1 wherein a supply voltage from said means for supplying power and said charging circuit means is applied to said processing means only when signals are received by or transmitted from said processing means.

4. The alarm apparatus defined in claim 1 wherein said processing means includes analyzing means for matching the interrupt signal from said detector means to predefined signal characteristics prior to transmitting information over said telephone circuit.

5. The alarm apparatus defined in claim 1 wherein said sensing means is a low power consumption sensor mounted in proximity to said processing means.

6. The alarm apparatus defined in claim 5 wherein said sensing means, said detector means, and said processing means are integrally encapsulated.

7. The alarm apparatus defined in claim 5 wherein said sensing means includes an infra-red sensor.

8. The alarm apparatus defined in claim 5 wherein said sensing means includes an sound-activated sensor.

9. The alarm apparatus defined in claim 5 wherein said sensing means includes an sound-activated sensor and an infra-red sensor.

10. The alarm apparatus defined in claim 1 including a case having said power supply means, said sensing means, said detector means, said processing means, and said charging circuit means mounted in said case.

11. The alarm apparatus defined in claim 10 wherein said case includes a keyboard mounted on the surface of said case and connected to said processing means.

12. The alarm apparatus defined in claim 1 wherein said processing means includes an input terminal connected to said telephone circuit for receipt of information from a selected receiver.

13. The alarm apparatus defined in claim 10 wherein said case includes a digital readout connect to said processing means.

14. The alarm apparatus defined in claim 1 wherein the selected receiver in communication with said telephone circuit includes a mobile telephone receiver.

15. The alarm apparatus defined in claim 1 wherein the selected receiver in communication with said telephone circuit includes a pager system receiver.

16. An alarm apparatus for monitoring the condition of a premises, comprising:

a telephone circuit connected to the premises;

means connected to said telephone circuit for obtaining power from said telephone circuit;

a low power consumption sensor, connected to said means for obtaining power, for detecting a predetermined condition at the premises and generating a sensor signal;

detector means, connected to said sensor, for receiving and integrating the sensor signal and generating an interrupt signal;

a programmable processor for receiving and analyzing the interrupt signal, and for transmitting and receiving information signals to and from a selected receiver in communication with said telephone circuit, said processor being connected to said means for obtaining power, said detector means and said telephone circuit, and being maintained in a stand-by mode until said programmable processor starting an operational mode; and a storage capacitor for supplying back-up power to said sensor, said detector means, and said processor, said storage capacitor being connected to said means for obtaining power whereby said means for obtaining power charges said storage capacitor during the stand-by mode, and said storage capacitor provides power during the stand-by mode when said telephone circuit is disconnected from said means for obtaining power and during the operational mode.

* * * * *